(No Model.)

B. DEEM.
SOIL PULVERIZER.

No. 303,421. Patented Aug. 12, 1884.

WITNESSES:
Otto Beyer
C. Sedgwick

INVENTOR:
B. Deem
BY Munn & Co
ATTORNEYS.

N. PETERS, Photo-Lithographer, Washington, D. C.

UNITED STATES PATENT OFFICE.

BENJAMIN DEEM, OF SPRING HILL, KANSAS.

SOIL-PULVERIZER.

SPECIFICATION forming part of Letters Patent No. 303,421, dated August 12, 1884.

Application filed March 12, 1884. (No model.)

*To all whom it may concern:*

Be it known that I, BENJAMIN DEEM, of Spring Hill, in the county of Johnson and State of Kansas, have invented a new and Improved Soil-Pulverizer, of which the following is a full, clear, and exact description.

My invention relates to an improvement in soil-pulverizers; and it consists of the detailed construction and combination of parts, substantially as hereinafter fully set forth and claimed.

Reference is to be had to the accompanying drawings, forming a part of this specification, in which similar letters of reference indicate corresponding parts in all the figures.

Figure 1:
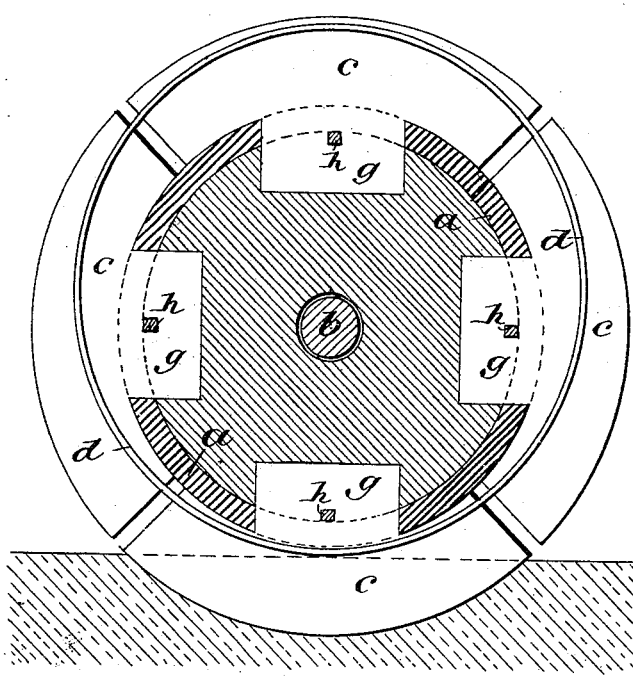
Figure 2:
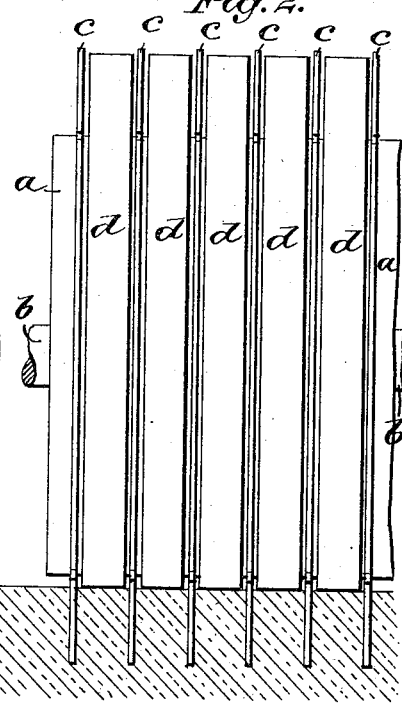
Figure 3:
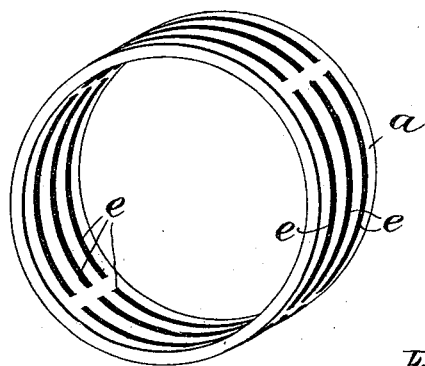
Figure 4:
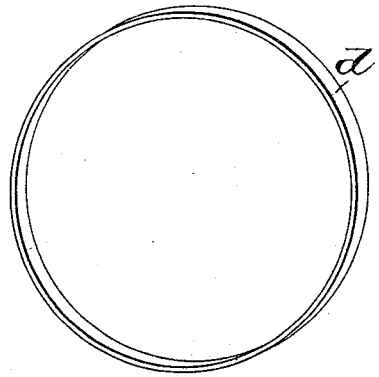
Figure 5:
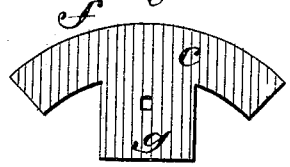

Figure 1 is a transverse section of my improved pulverizer. Fig. 2 is a front elevation. Fig. 3 is a perspective view of a portion of the roller. Fig. 4 is a perspective view of one of the cleaning-rings, and Fig. 5 is a side elevation of one of the cutters.

I make a roller, cylinder, or drum, $a$, in any approved way or form of construction, having an axle, $b$, secured about centrally of a core fitted in the drum or cylinder for connecting it with a frame for hitching to it for drawing it over the ground in the common way of drawing rollers, and connect a series of circumferential cutters, $c$, to it at suitable distances apart along the surface from end to end, so that when the roller is drawn along the ground said cutters will be pressed in to the extent of their projection from the surface of the cylinder, which may be more or less, as preferred, and said cutters will break up and pulverize the soil by raising up that which packs in between the cutters, besides cutting the weeds, grass, turf, and clods of the surface through which the cutters are forced into the ground. Each of the series of cutters $c$ is provided upon the inner portion with a projection or tenon, $g$, which passes through a slot of the cylinder or drum and is let into a mortise or socket of the cylinder or drum core, where it is firmly held by a rod or key, as shown. In each space, between the cutters I arrange a loose ring of metal, $d$, in the form of a hoop, to roll along the surface of the ground, and crowd out and discharge the earth raised between the cutters, said rings being smaller than the circumferential line of the cutters, but enough larger than the cylinder to rise about flush with the edges of the cutters over the roller and thus press out the earth.

The cutters may of course consist of continuous rings, and the roller may be made in sections, and be connected together with a ring in each space between the sections; but I prefer to make the roller of a hollow cylinder with sectional circumferential slots $e$, and make segmental cutters $f$ to fit in the slots, and having a tenon, $g$, extending through the shell of the roller into the interior space, when the tenons may be fastened in any approved way, as by keys $h$, or pins drawn through the tenons. I do not limit myself, however, to any particular means of connecting the cutters.

Having thus fully described my invention, I claim as new and desire to secure by Letters Patent—

In a soil-pulverizer, the roller comprising the cylinder or drum $a$, fitted with a core secured upon the axle of the carrying-frame, said drum or cylinder having a series of rows of slots, $e$, in combination with the segmental cutters $c$, with their inner surfaces provided with projections or tenons fitting into sockets or mortises of said core, and secured therein, as shown, substantially as and for the purpose set forth.

BENJAMIN DEEM.

Witnesses:
JNO. S. GASAWAY,
FRANK HOYES.